United States Patent [19]

Hendy et al.

[11] 4,151,224

[45] Apr. 24, 1979

[54] BLENDS OF ACRYLONITRILE COPOLYMERS WITH GRAFT COPOLYMERS CONTAINING RUBBER AND ACRYLONITRILE COPOLYMER

[75] Inventors: Brian N. Hendy, Knebworth; Carl F. Mathews; Eric Nield, both of Ware; John B. Rose, St. Albans; Peter I. Vincent, Welwyn Garden City, all of England

[73] Assignee: Imperial Chemical Industries Limited, United Kingdom

[21] Appl. No.: 573,329

[22] Filed: Apr. 30, 1975

Related U.S. Application Data

[63] Continuation of Ser. No. 107,563, Jan. 18, 1971, abandoned, which is a continuation of Ser. No. 755,801, Aug. 28, 1968, abandoned, which is a continuation-in-part of Ser. No. 622,904, Mar. 14, 1967, abandoned.

[30] Foreign Application Priority Data

Mar. 24, 1966 [GB] United Kingdom ............... 13071/66
Sep. 20, 1967 [GB] United Kingdom ............... 42899/67

[51] Int. Cl.$^2$ ............................................. C08L 51/04
[52] U.S. Cl. ........................... 260/876 R; 260/880 R; 260/879
[58] Field of Search ............... 260/876 R, 880 R, 879

[56] References Cited

U.S. PATENT DOCUMENTS

| | | | |
|---|---|---|---|
| 2,559,155 | 7/1951 | Chapin et al. | 260/855 |
| 2,820,773 | 1/1958 | Childers et al. | 260/45.5 |
| 3,378,605 | 4/1968 | Baer | 260/876 |
| 3,442,979 | 5/1969 | Ott et al. | 260/880 |
| 3,600,465 | 8/1971 | Knapp et al. | 260/880 |
| 3,652,726 | 3/1972 | Nield et al. | 260/876 |
| 3,763,278 | 10/1973 | Griffith et al. | 260/880 R |

*Primary Examiner*—Richard B. Turer
*Attorney, Agent, or Firm*—Cushman, Darby & Cushman

[57] ABSTRACT

A graft copolymer comprises a substrate of a diene rubber, and a homogeneous superstrate containing units of acrylonitrile and at least one aromatic olefin having a molar ratio of acrylonitrile to olefin between 2 and 9. The superstrate may also contain a minor amount (preferably less than 10 mole %) of at least one other comonomer selected from acenaphthylene, vinyl carbazole and its derivatives, maleimide and its N-substituted derivatives and norbornene and its derivatives.

16 Claims, No Drawings

BLENDS OF ACRYLONITRILE COPOLYMERS WITH GRAFT COPOLYMERS CONTAINING RUBBER AND ACRYLONITRILE COPOLYMER

This is a continuation of U.S. application Ser. No. 107,563, filed Jan. 18, 1971 which in turn is a continuation of U.S. application Ser. No. 755,801, filed Aug. 28, 1968 which in turn is a continuation-in-part of U.S. application Ser. No. 622,904, filed Mar. 14, 1967, all of said applications being abandoned.

This invention relates to graft copolymers comprising a substrate of a diene rubber and a superstrate containing a conjugated aromatic olefin with a high proportion of acrylonitrile.

These copolymers may be made by copolymerising acrylonitrile and the aromatic olefin, e.g. styrene, in the presence of the diene rubber. The superstrate probably comprises chains of acrylonitrile-styrene copolymer bonded chemically to the substrate, although it may also comprise (at least to some extent) a separate resin formed from the superstrate monomers physically mixed with the rubber but much more intimately than in a normal blend of preformed polymers.

Owing to the great ease with which conjugated aromatic olefins copolymerise in the presence of a high proportion of acrylonitrile, the portion of superstrate formed at the beginning of the reaction tends to be enriched with the aromatic olefin at the expense of the portion of superstrate formed at the end of the reaction; the latter therefore tends to have the disadvantageous properties of crystalline polyacrylonitrile. This may result in inhomogeneity reflected in the properties of the graft and of blends containing it.

According to the present invention, a graft copolymer comprises a substrate of a diene rubber (containing from 40% to 100% molar of units from at least one conjugated 1,3-diene monomer and from 0% to 60% molar of units from at least one other ethylenically unsaturated monomer copolymerisable therewith using free radical catalysts) and a homogeneous superstrate containing units of acrylonitrile and at least one aromatic olefin, the molar ratio of units of acrylonitrile to units of aromatic olefin in the superstrate being between 2 and 9. The conjugated aromatic olefin is selected from those of the formula $CH_2:CR,Ar$ and also indene and coumarone. In this formula R is hydrogen or methyl and Ar is an optionally ring-substituted residue of aromatic character having not more than 3 rings and each substituent (if any) having not more than 4 carbon atoms. Examples of such olefins include styrene, α-methylstyrene, o-methylstyrene, m-methylstyrene, p-methylstyrene, m-vinylphenol, p-trimethylsilylstyrene, 2,5-dimethylstyrene, p-methoxystyrene, 1-vinylnaphthalene, p-dimethylaminostyrene, p-acetamidostyrene, ar-dibromostyrene, 2-vinylthiophene, 3-vinylphenanthrene and 2-methyl-5-vinylpyridine. It is preferred that the predominant olefin is styrene, α-methylstyrene or a mixture of styrene and α-methylstyrene.

The diene rubber contains from 40 to 100% molar of at least one conjugated 1,3-diene monomer and from 0 to 60% molar of at least one other ethylenically unsaturated monomer copolymerisable with free radical catalysts. Suitable dienes include for example butadiene, isoprene, 2,3-dimethylbutadiene, piperylene and chloroprene. A wide variety of other monomers may be used, including aralkenes such as styrene and α-methylstyrene, esters of acrylic and methacrylic acids such as methyl, ethyl, n-butyl and 2-ethylhexyl acrylates and methyl and n-butyl methacrylates, esters of fumaric acid, and unsaturated nitriles such as acrylonitrile and methacrylonitrile; styrene and acrylonitrile are particularly convenient.

The products of the invention may be made by a sequential polymerisation in which the monomers for the superstrate are polymerised by free radical catalysts in bulk or in a liquid diluent containing the substrate rubber in suspension or solution. The polymerisation is conveniently carried out in an aqueous emulsion, although suspension or bulk polymerisations may also be used, in combination if desired.

The problem of obtaining a homogeneous superstrate is associated with the high molar ratio of acrylonitrile to olefin in the desired product; there is usually no difficulty when the molar ratio is 1 or less. A homogeneous product can be made by arranging for the relative concentration of the aromatic olefin and acrylonitrile at the start of the reaction to be at such a level that the superstrate initially formed is the desired composition, and then adding further quantities of the aromatic olefin (together with some acrylonitrile if desired) at a rate determined by the rate of polymer formation, so that the relative concentration of the aromatic olefin and acrylonitrile in the reaction mixture remains at about the initially desired level.

To produce 100 g of a homogeneous copolymer of acrylonitrile and styrene, for example, the amount of styrene to be mixed with the whole required amount of acrylonitrile in the initial charge has been determined empirically for copolymers of various styrene contents, and the results are shown in the following table (the rest of the styrene being added continually during the polymerisation).

| Styrene in Initial Charge | Acrylonitrile in Initial Charge | Styrene in Copolymer | Molar Ratio of Acrylonitrile |
|---|---|---|---|
| 2.1 cm$^3$ | 93.2 cm$^3$ | 15% molar | 5.7 |
| 2.4 cm$^3$ | 88.6 cm$^3$ | 17.5% molar | 4.7 |
| 2.5 cm$^3$ | 84.0 cm$^3$ | 20% molar | 4 |
| 4.0 cm$^3$ | 68.1 cm$^3$ | 30% molar | 2.3 |

Any method suitable for making homogeneous copolymers in the absence of the rubber may be applied for the manufacture of the grafts of the present invention. British patent specification 663,268 describes a method of doing this, in which acrylonitrile and styrene or α-methylstyrene are added to an aqueous medium at the reflux temperature, the aqueous medium containing a water-soluble peroxy catalyst and a dispersing agent, and the rates of addition being much as to maintain a substantially constant reflux temperature in the aqueous medium. Another convenient method is to measure the heat of polymerisation during the reaction by isothermal or adiabatic calorimetry and add monomer pro rata as heat is produced.

The desired product may be isolated from the polymerisation medium, freed from residual monomers, and dried. For some purposes it can then be used directly in the fabrication of shaped structures or coatings; this is particularly true of the grafts containing relatively small amounts of rubber. An important use for grafts is in blending with compatible resins so as to improve their impact resistance. A particularly suitable resin for this purpose is one made as described above for the graft but omitting the rubber.

When both the graft and the resin required for blending are available as latices (e.g. as the products of an aqueous emulsion polymerisation), the components need not be isolated but the latices can be mixed, i.e., the graft and the resin are latex-blended. After adding any required additives, e.g. stabilisers and antioxidants, the blend is then coagulated by pouring into a dilute electrolyte slution, e.g. aluminium sulphate or calcium chloride solution, and the product isolated and washed with hot water.

Alternatively the two components may be melt-blended on a mill having heated rollers, or in an extruder.

A product in many ways equivalent to a blend may also be obtained directly by adjusting the conditions of the grafting polymerisation so that some of the superstrate monomers copolymerise to give some separate resin as well as the graft; thus the graft is produced concurrently together with the resin.

The toughness of the final blended composition is governed not only by the amount of rubber it contains (preferably 1% to 50% by weight) but also be the proportion of superstrate in the graft used for blending.

The superstrate of the graft may also contain a minor amount (i.e. less than the amount of aromatic olefin) of copolymerised units of other ethylenically unsaturated compounds copolymerisable therewith using free radical catalysts. For example the refractive index may be adjusted by the incorporation of an alkyl methacrylate to match the refractive index of a resin to produce a transparent blend.

The softening point of acrylonitrile/styrene copolymers may be increased by copolymerising a minor amount of at least one comonomer selected from acanaphthylene, vinyl carbasole and its derivatives, maleimide and its N-substituted derivatives, and norbornene and its derivatives. In the present invention, the selected comonomer is incorporated into the superstrate of the graft copolymer. The effect of the comonomer in the final product will depend on the manner in which it is incorporated. Thus, for example, where a small quantity of comonomer is incorporated into the superstrate of a graft used subsequently to form a blend having a low graft content, the effect of the comonomer on the softening point of the blend will naturally be low. However, the compatibility between the graft and resin is best when the graft superstrate and the resin are of the same composition, and a terpolymer graft according to the invention may therefore be used with advantage when blended with a terpolymer resin of composition corresponding to that of the superstrate of the graft. Suitable resins for these blends are discloed in U.S. application 622,268.

The preferred comonomers are those having the ethylenic unsaturation in the ring, thereby introducing the ring into the polymer chain. Of these, the maleimides, particularly, N-aryl substituted maleimides, are preferred as they are not only very effective in the present invention, but they are also readily obtainable from an $\alpha,\beta$-ethylenically unsaturated, cis-$\alpha,\beta$-dicarboxylic acid and an aniline. A process for preparing N-aryl maleimides in good yield is described in U.S. Pat. No. 3,338,919 and U.S. Pat. application No. 550,362. Many different anilines are readily available and yield N-aryl maleimides that may be used as comonomers for the novel copolymers. The aryl substituent is derived from an aromatic hydrocarbon or heterocycle in which one or more of the hydrogen atoms may be replaced by other atoms or groups. Substituents containing active hydrogen atoms, however, are generally to be avoided because they may interfere with polymerisations catalysed by free radicals. The aryl groups that may be present in the N-aryl maleimides include for example, phenyl, 4-diphenyl, 1-naphthyl, all the mono- and dimethylphenyl isomers, 2,6-diethylphenyl, 2-, 3- and 4-chlorophenyl, 4-bromophenyl and other mono- and di-halophenyl isomers 2,4,6-trichlorophenyl, 2,4,6-tribromophenyl, 4-n-butylphenyl, 2-methyl-4-n-butylphenyl, 4-benzylphenyl, 2-, 3- and 4-methoxyphenyl, 2-methoxy-5-chlorophenyl, 2-methoxy-5-bromophenyl, 2,5-dimethoxy-4-chlorophenyl, 2-, 3- and 4-ethoxyphenyl, 2,5-diethoxyphenyl, 4-phenoxyphenyl, 4-methoxycarbonylphenyl, 4-cyanophenyl, 2-, 3- and 4-nitrophenyl, and methyl-chlorophenyl (2,3-, 3,4-, 2,5- and 4,3-isomers). The N-(o-substituted phenly) maleimides are generally less coloured than the other isomers or the unsubstituted compounds and may therefore be preferred if a relatively colourless product is desired. It is preferable to avoid maleimide, and particularly N-alkyl maleimides since terpolymers containing them have a greater water sensitivity.

Norbornene and its derivatives are also of interest as they are ethylenically unsaturated cyclic compounds which are very readily prepared by a Diels Alder addition to cyclopentadiene of for example acrylonitrile, vinylidene cyanide, or methyl acrylate. Of the possible norbornene derivatives which are readily obtainable, norbornene, 4-cyanonobornene, and methylenenborane were found to raise the softening point, while with 4,4-dicyanonorbornene, 4,5-dicyanonorbornene, 4-carbomethoxynorbornene and 4-methyl-4-carbomethoxynorbornene, no increase in softening point was observed. This is believed to be due to the double bond in these compounds being less reactive in free radical copolymerisation, and the monomers failing to become incorporated into the chain.

The monomer added in addition to the acrylonitrile and aromatic olefin will normally represent only a small percentage of the total superstate, i.e. less than 10% molar and usually less than 5% molar. They may generally be added in entirety to the initial charge. However, where the reactivity of the added monomers is high compared with that of acrylonitrile it is preferable to add them to the monomer feed.

The grafts or their blends, mixed with any desired fillers or reinforcing materials, lubricants and stabilisers, can be used as thermoplastic raw material to make articles which require a good resistance to impact. Their toughness coupled with high strength and high softening point may thus be displayed to advantage. For example, the compositions may be extruded into sheet or tube, and the sheet can be calendered with embossing if desired or can be shaped as required e.g. by pressing, drawing or vacuum-forming. The compositions can also be compression-moulded and injection-moulded. Examples of articles that may thus be produced using the compositions of the invention include panelling and exterior casing for machinery (as in motor cars, office machines and household equipment), crash helmets, pipes for conveying fluids, and telephone receivers. The use of compositions of the invention havin superior tensile strength coupled with toughness and rigidity may allow economy of material in comparison with currently used products in that thinner pieces would serve the same purpose. The advantageous physical properties of the compositions may also permit them to be used in engineering applications for which plastics have not hitherto been suitable.

Of the following examples, Example 1 describes for comparative purposes the production of a graft in conventional manner while Examples 2 to 17 illustrate the invention.

The tensile test was carried out at $+20°$ C. on specimens 76 mm long and 14 mm wide milled from a compression moulded sheet 3 mm thick. The cross-sectional area across the centre of the specimen was reduced to 9 mm$^2$ by milling two slots (radius of curvature 31 mm) opposite each other in the long edges so that the narrowest width of the specimen was 3 mm. A tensile stress was then applied to the specimen sufficient to elongate it at the rate of 12.7 mm/min. and the stress at the yield point (or brittle fracture) was recorded.

The impact strength (unnotched specimen) test was carried out at 20° C. on a specimen 0.9 cm wide and 0.3 cm thick, resting horizontally (with the narrow face uppermost) against two supports 3.8 cm apart. The specimen was struck centrally on the wider face by a horizontally moving pendulum falling from 30 cm, with more than sufficient energy to break the specimen. From the residual energy of the pendulum, the energy required to break the specimen was calculated and then divided by the effective volume (1/9 × 3.8 × 0.9 × 0.3 cm$^2$). The resulting value (expressed in joules/cm$^3$) represented the energy required to cause cracks to form in the material.

In the notched specimen impact test, also carried out at 20° C., a specimen 6 cm long, 0.65 cm wide and 0.3 cm thick was given a 45° notch 0.28 cm deep (tip radius not greater than 0.025 cm) in the centre of one edge. It was supported between two supports 5 cm apart and struck centrally on the edge opposite the notch by a pendulum dropping from 30 cm with more than sufficient energy to break the specimen. From the residual energy of the pendulum the energy required to break the specimen was calculated and divided by the cross-sectional area of the specimen at the notch. The resulting value (expressed in joules/cm$^2$) represents the energy required to break the material.

EXAMPLE 1

Monomer mixtures containing various amounts of acrylonitrile were polymerised in the presence of a rubber latex not short-stopped formed of 70% molar butadiene and 30% molar acrylonitrile and containing 47.5% solids. The latex (80 g) was placed with water (600 cm$^3$), ammonium persulphate (1.00 g sodium metabisulphite (0.83 g) and the monomers (100 g in all) in a one-liter shaking autoclave. Air was removed and replaced by nitrogen. The mixture was then shaken at 30° C. under nitrogen for 18 hours. The products were coagulated using 0.75% aqueous calcium chloride and washed with water and methanol. Their properties are given below.

| Monomers | | Tensile strength | Impact strength |
|---|---|---|---|
| Acrylonitrile | Styrene | (brittle fracture kgf/mm$^2$) | (unnotched specimen) J/cm$^2$ |
| 90 g | 10 g | 1.3, 2.6 | 0.4 |
| 90 g | 10 g* | 3.0 | 0.75 |
| 85 g | 15 g | 3.0, 3.3 | 0.9 |
| 85 g | 15 g* | — | — |
| 80 g | 20 g | — | — |

-continued

| Monomers | | Tensile strength | Impact strength |
|---|---|---|---|
| Acrylonitrile | Styrene | (brittle fracture kgf/mm$^2$) | (unnotched specimen) J/cm$^2$ |
| 80 g | 20 g | — | — |

*(made with 1.0% octanethiol in polymerisation reaction medium)

On X-ray analysis all the products showed the 2-dimensional order characteristic of polyacrylonitrile; this was similarly observed in products made with 100 g of acrylonitrile, or 95 g of acrylonitrile and 5 g of styrene, and was not lessened by the use of more styrene.

EXAMPLE 2

A homogeneously grafted copolymer containing 80% molar acrylonitrile units and 20% molar styrene units was made using a rubber latex not short-stopped formed of 70% molar butadiene and 30% molar acrylonitrile and containing 47.5% solids. The latex (50 g) was placed with water (400 cm$^3$) in a four-necked vessel equipped with a stirrer, thermometer, reflux condenser and arrangements for evacuating the gas space and introducing nitrogen. Air was replaced by nitrogen, styrene (0.83 g) and acrylonitrile (26.05 g) were added, and the mixture was heated to reflux temperature (about 71° C). Ammonium persulphate (0.3 g) in water (1.0 cm$^3$) was then added, and as the boiling point tended to rise a mixture of styrene (41.6 g) and acrylonitrile (84.8 g) was added gradually at such a rate to maintain the boiling point approximately constant.

| Time after adding initiator | Boiling point |
|---|---|
| 0 minutes | 71° C. |
| 5 minutes | 74° C. |
| 10 minutes | 73° C. |
| 15 minutes | 75° C. |
| 20 minutes | 76° C. |

After 20 minutes, when the addition was complete, 5% w/v aqueous sodium dimethyldithiocarbamate (1 cm$^3$) was added and the mixture was poured into ethanol (1 dm$^3$). The precipitated product was coarsened by adding calcium chloride and boiling; it was then filtered off, washed with water and methanol and dried to yield a homogeneous graft copolymer (122 g) containing 19.5% rubber and in which the superstrate contained 80% molar acrylonitrile units and 20% molar styrene units.

It gave transparent yellow mouldings at 200° C. In the tensile heat it was not brittle but yielded at 8.0 kgf/mm$^2$. It did not break in the test of impact strength (unnotched specimen). In the notched specimen test the impact strength was 0.23 J/cm$^2$.

EXAMPLE 3

A graft copolymer containing about 16% of rubber, and in which the superstrate contained homogeneously copolymerised acrylonitrile units (77% molar) and styrene units (23% molar) who made from an initial charge consisting of water (350 cm$^3$), styrene (5.7 g), acrylonitrile (103 g) and a latex (50 g) of a rubber not short-stopped formed from butadiene (70% molar) and acrylonitrile (30% molar) and containing 47.5% solids (pH 5.7). Air was removed and replaced by nitrogen. While the reaction vessel was maintained at about 30° C., an initiator solution containing ammonium persulphate (1.09 g) and sodium metabisulphide (0.907 g) was added, and then a gradual feed of air-free styrene (54 g) was added in portions of 0.5–1.0 cm$^3$ linearly at the rate styrene was undergoing polymerisation, as calculated from the ratio of production of heat (176 kJ) in the reaction vessel. The styrene was added over 139 minutes from the addition of the initiator, and after 218 minutes 5% w/v aqueous sodium dimethyidithiocarbamate solution (3 cm$^3$) was added. The latex was coagulated using ethanol (1 dm$^3$) at about 60° C. and the precipitate was washed four times with water at 60 to 70° C. and twice with methanol and dried to yield a homogeneous graft copolymer (150 g) containing 15.8% by weight of rubber. It gave transparent pale yellow mouldings at 200° C. In the tensile test it was not brittle but yielded at 7.3 kgf/mm$^2$. Its impact strength (unnotched specimen) was greater than 19 J/cm$^3$. In the notched specimen test the impact strength was 0.23 J/cm$^2$.

This graft latex could be latex-blended with a homogeneously copolymerised acrylonitrile/styrene copolymer (molar ratio 78:22) to give a tough strong composition.

EXAMPLE 4

A graft copolymer containing 80 mole % acrylonitrile and 20 % styrene in the grafted phase was prepared using a polybutadiene latex containing 61% solide. A mixture of the latex (549 g) and water (1350 cm$^3$) was placed in the polymerisation vessel, and the air replaced by nitrogen. Acrylonitrile (248 cm$^3$) and styrene (7.0 cm$^3$), were then added and the mixture heated to approximately 50° C. Dextrose (1.6 g) and cumene hydroperoxide (1.20 g) were added together with sufficient activator (approximately 0.08 g ferrons sulphate + 0.40 g sodium pyrophosphate in 10 cm$^3$ water), to give a reasonable rate of polymerisation. The rate of polymerisation was followed by isothermal calorimetry, and styrene was fed to the reaction mixture so that the ratio of acrylonitrile to styrene in the mixture maintained its initial value.

After approximately two hours (about 80% completion), the reaction was stopped by addition of sodium dimethyldithiocarbamate (20 cm$^3$ of 0.1% solution) and the product precipitated by addition to calcium chloride solution, washed with water and dried.

A blend of this material with a homogeneous resin containing 80 mole % acrylonitrile and 20 mole % styrene to give a final product containing 10% polybutadiene by weight gave a material with yield stress of 7.7 kgf/mm$^2$ and a notched impact strength of 1.72 J/cm$^2$ (these results were obtained on compression mouldings of extruded chip). The Vicat softening point was 106° C.

EXAMPLE 5

The preparation described in Example 4 was repeated on a smaller (r) scale with the addition of 1% emulsifier (sodium salt of disproportionated rosin acid) based on the polybutadiene content of the polymerisation mixture. A moulding of the grafted product had a yield stress of 1.1 kgf/mm$^2$ and an elongation of 64% at the break point.

EXAMPLE 6

The preparation described in Example 4 was repeated using an initial charge of 194 g latex, 675 cm$^3$ water, 200 cm$^3$ water, 200 cm$^3$ acrylonitrile, 5.6 cm$^3$ styrene, 3 g dextrose and 2 g cumene hydroperoxide. A blend containing 10% polybutadiene was prepared from the product of this reaction and a homogeneous 80:20 acrylonitrile:styrene resin, and had a yield stress of 7.9 kgf/mm$^2$, a notched impact strength of 0.86 J/cm$^2$ and a Vicat softening point of 107° C.

EXAMPLE 7

The preparation described in Example 6 was repeated using one tenth the quantities of initiator, i.e. 0.3 g dextrose and 0.2 g cumene hydroperoxide. A blend containing 10% polybutadiene was again prepared and had a yield stress of 7.2 kgf/mm$^2$ and a notched impact strength of 0.75 J/cm$^2$.

EXAMPLE 8

The preparation described in Example 4 was repeated on a smaller (½) scale with the addition of (a) 1.5% and (b) 3.0% chain transfer agent (octane-1-thiol) to the polymerisation mixture (40% of the chain transfer agent was added initially and 60% with the styrene feed). A 10% blend produced from them with a homogeneous 80/20 mole % acrylonitrile/styrene resin showed the properties tabulated below.

|  | a | b. |
|---|---|---|
| Yield stream of blend | 6.9 Kgf/mm$^2$ | 7.2 Kgf/mm$^2$ |
| Notched impact strength of blend | 0.88 J/cm$^2$ | 0.62 J/cm$^2$ |

The addition of chain transfer agents to the grafting reaction had no appreciable effect on the melt viscosity of the subsequent 10% blends.

EXAMPLE 9

Using the technique described in the preceding examples, graft materials containing varying quantities of polybutadiene from 40–95% were prepared. Blends containing 10% polybutadiene were prepared from these graft materials by blending with 80:20 acrylonitrile:styrene resin (homogeneously copolymerized) and their properties are tabulated below.

| polybutadiene in graft | field stream of blend | Notched impact strength of blend |
|---|---|---|
| 40.4 | 6.9 kgf/mm$^2$ | 1.54 J/cm$^2$ |
| 57.9 | 6.8 kgf/mm$^2$ | 1.70 J/cm$^2$ |
| 82.5 | 7.2 kgf/mm$^2$ | 0.63 J/cm$^2$ |
| 94.9 | 7.6 kgf/mm$^2$ | 1.17J/cm$^2$ |

EXAMPLE 10

Using a technique similar to that described in the preceding examples, a graft material containing 61% polybutadiene was prepared and mixed with 80:20 acrylonitrile:styrene resin (homogeneously copolymerised) to give three blends containing 5, 10 and 20% polybutadiene respectively.

The properties of these blends are tabulated below.

| % polybutadiene in blend | Yield stress | Notched impact strength |
|---|---|---|
| 5 | 8.1 kgf/mm$^2$ | 0.28 J/cm$^2$ |
| 10 | 6.6 kgf/mm$^2$ | 2.80 J/cm$^2$ |
| 20 | 5.2 kgf/mm$^2$ | 3.77 J/cm$^2$ |

EXAMPLE 11

Using the techniques described in the preceding examples with the exception that the feeding of styrene during the polymerisation was made in aliqots of various size instead of by the very gradual addition described before, several graft materials was prepared. The 10% blends with homogeneously polymerised 80:20 acrylonitrile:styrene resin produced from these graft materials show the properties tabulated below.

| Size of aliquot during styrene feeding | Yield stress of blend | Notched impact strength of blend |
| --- | --- | --- |
| Gradual Feed, ca. 1 cm$^3$ or less | 6.8 kgf/mm$^2$ | 1.70 J/cm$^2$ |
| 10 cm$^3$ | 7.2 kgf/mm$^2$ | 1.49 J/cm$^2$ |
| 20 cm$^3$ | 7.4 kgf/mm$^2$ | 0.75 J/cm$^2$ |

A 10% blend prepared from a graft material produced by addition of all monomers to the polymerisation mixture initially, i.e. so that there was no feeding of styrene during the polymerisation, had a yield stress of 7.2 kgf/mm$^2$ and a notched impact strength of 0.41 J/cm$^2$.

This example indicates that to produce materials of good impact properties some degree of styrene feeding during the graft polymerisation is necessary although the feeding need not be anywhere near as accurate as that required for preparation of 80:20 acrylonitrile:styrene resins of good properties; i.e. in the grafted material, exact uniformity of composition is not necessary for good properties in the subsequent blends.

EXAMPLE 12

A 10% blend has been prepared in a single polymerisation reaction using the following procedure. The polybutadiene latex (65 g) was mixed with water (1100 cm$^3$) and placed in the polymerisation vessel; the air was replaced by nitrogen and acrylonitrile (372 cm$^3$) and styrene (10.5 cm$^3$) added, the mixture being heated to about 50° C. Emulsifier (sodium salt of dodecyl benzene sulphonic acid) (12 g), dextrose (4.9 g) and cumene hydroperoxide (3.68 g) were added together with octane-1-thiol (0.97 cm$^3$). Sufficient activator (about 0.3 g sodium pyrophosphate and 0.006 g ferrous sulphate) was added to give a polymerisation of reasonable rate; the rate of polymerisation was followed by isothermal calorimetry and a mixture of styrene (150.4 cm$^3$) and octane-1-thiol (1.65 cm$^3$) was fed gradually to the polymerisation mixture so as to maintain the ratio of acrylonitrile to styrene in the mixture at its initial value.

After approximately 2 hours, the reaction was stopped by addition of sodium dimethyldithiocarbamate and worked up as described in Example 4. The product, a white powder, gave a moulding having a yield stress of 8.1 kgf/mm$^2$ and a notched impact strength of 0.56 J/cm$^2$.

EXAMPLE 13

A graft material containing a grafted phase consisting of uniform 70:30 acrylonitrile styrene resin was prepared using the technique of Example 4 and an initial charge of latex (325 g), water (850 cm$^3$), emulsifier (sodium salt of disproportionated resin acid) (2 g), acrylonitrile (136 cm$^3$), styrene (14.3 cm$^3$), dextrose (1.0 g), cumene hydroperoxide (0.75 g) and sufficient to activate the reaction of ferrous sulphate (0.02 g) and sodium pyrophosphate (0.1 g). Styrene (86.5 cm$^3$) was fed to the reaction mixture during the polymerisation.

The graft material, which contained about 56% butadiene, was mixed with 70:30 acrylonitrile:styrene resin to give a material containing 10% polybutadiene (I) and a material containing 30% butadiene (II). The impact data on these blends are given below.

| | Yield stress | Notched impact strength |
| --- | --- | --- |
| I | 6.7 kgf/mm$^2$ | 1.47 J/cm$^2$ |
| II | 3.3 kgf/mm$^2$ | 3.64 J/cm$^2$ |

EXAMPLE 14

A graft copolymer containing acrylonitrile, styrene and N-o-chlorophenyl maleimide in the grafted phase was prepared using a polybutadiene latex containing 57% by weight of solids. A mixture of the latex (224 g) and water (1012 cm$^3$) was placed in the polymerization vessel and the air replaced by nitrogen. An emulsifier (sodium salt of a disproportionated resin acid) (5 g) was added and the pH of the latex adjusted to between 5 and 6 with N/10 sulphuric acid. Acrylonitrile (93 cm$^3$), styrene (3.0 cm$^3$) and N-o-chlorophenyl maleimide (10.5 g) were then added and the mixture heated to about 50° C. Sufficient of a 1% solution of potassium persulphate and of a 1% solution of sodium bisulphite was added to give a reasonable rate of polymerisation. The rate of polymerisation was followed by isothermal colorimetry and styrene fed to the reaction so that the ratio of acrylonitrile to styrene in the mixture maintained its initial value.

After approximately 4 hours the reaction was stopped by the addition of sodium dimethyldithiocarbamate (50 cm$^3$ of a 2.5 weight % solution).

108.5 g of the graft latex was stabilised by adding 0.8 g of a highly refined grade of 2,6-ditertiary-butyl p-cresol, and 0.4 g of dilauryllithiodipropionate, and blended with a homogeneous acrylonitrile/styrene/N-o-chlorophenyl maleimide resin having monomer units in the ratio of 80/20/3 respectively. The blend was coagulated by pouring into 1.5 its volume of aqueous 0.5% w/v aluminium sulphate solution at 75° C. The solid was separated, washed three times with water at 60° C. and dried on a fluidised bed with nitrogen at 80° C. The blend contained 10% by weight of rubber.

The dry blend was compression moulded at 200° C., and the moulded plaque had a Vicat softening point of 124° C., and a yield stress of 7.2 kgf/mm$^2$.

EXAMPLE 15

108.5 g of a graft copolymer of acrylonitrile, styrene and N-o-chlorophenyl maleimide or butadiene as prepared in Example 15 was blended with 228 g of a latex of a homogeneously polymerised acrylonitrile/styrene copolymer in which the molar ratio of acrylonitrile to styrene was 80/20. The blend was stabilised, separated and compression moulded as for Example 1 to give a product containing 10% by weight of rubber. The moulded plaque had a notched impact strength of 6.1 J/cm$^2$, Vicat softening point of 109° C. and a yield stress of 7.7 kgf/mm$^2$.

EXAMPLE 16

A graft copolymer containing acrylonitrile, α-methylstyrene and N-o-chlorophenylmaleimide in the grafted phase was prepared using the technique of Example 15. The initial charge comprised acrylonitrile (88 cm$^3$), α-methylstyrene (3.3 cm$^3$), N-o-chlorophenyl maleimide (6.6 g), emulsifier (4 g), water (1012 cm$^3$) and a polybutadiene latex (175 g).

112.5 g of the graft latex were stabilised as in Example 1 and blended with a latex of homogeneously copolymerised acrylonitrile/α-methylstyrene/N-o-chlorophenyl maleimide terpolymer having monomer units in the ratio of 80/20/2 to give a blend containing 10% by weight of rubber. The blend was isolated and moulded as per Example 14, the moulded plaque having a Vicat softening point of 122° C., and a yield stress of 7.0 kgf/mm$^2$.

EXAMPLE 17

112.5 g of graft latex of Example 16 were stabilized as before and blended with a latex of homogeneous acrylonitrile/styrene resin having monomer units in the molar ratio of 80/20, to give a blend containing 10% by weight of rubber. The blend was isolated and moulded as in Example 14 and had a notched impact strength of 7.7 J/cm$^2$, a Vicat softening point of 109° C., and a yield stress of 7.0 kgf/mm$^2$.

We claim:

1. A blend comprising (A) a graft copolymer consisting essentially of up to 95% by weight of a substrate of a diene rubber containing from 40% to 100% molar of units from at least one conjugated 1,3 diene monomer and from 0 to 60% molar of units from at least one other ethylenically unsaturated monomer copolymerizable therewith using free radical catalysts, and a homogeneous superstrate consisting of units of acrylonitrile, randomly distributed units of at least one monovinylidene aromatic compound, the molar ratio of units of acrylonitrile to units of said monovinylidene aromatic compound in the superstrate being between 2 and 9 and 0 to 5% molar of ethylenically unsaturated monomer copolymerizable with acrylonitrile and said monovinylidene aromatic compound using free radical catalysts, said graft copolymer being the product obtained by forming a mixture of said rubber, a portion of said monovinylidene aromatic compound and at least a portion of said acrylonitrile and said ethylenically unsaturated monomer, polymerizing said mixture and adding quantities of a monomeric feed selected from the group consisting of said monovinylidene aromatic compound and mixtures of said monovinylidene aromatic compound with any of said acrylonitrile and said ethylenically unsaturated monomer not present in said mixture, said monomeric feed being added to said mixture at a rate determined by the rate of polymer formation and such that the relative concentration of said monovinylidene aromatic compound and acrylonitrile in the reaction mixture remains at about the initial level and (B) a resin which comprises a homogeneous copolymer containing units of acrylonitrile and units of monovinylidene aromatic compound, the molar ratio of units of acrylonitrile to units of monovinylidene aromatic compound in the said resin being between 2 and 9, and the amount of rubber in the blend being within the range 1 to 50% by weight.

2. A blend according to claim 1 in which the resin comprises a homogeneous copolymer of acrylonitrile, at least one monovinylidene aromatic compound and a minor amount of at least one copolymerizable ethylenically unsaturated monomer selected from the group consisting of maleimide and its N-substituted derivatives, and norbornene and its derivatives, the molar ratio of acrylonitrile to other monomers being between 2 and 9.

3. A blend according to claim 1 in which styrene is the predominant monovinylidene aromatic compound in the blend.

4. A blend according to claim 1 in which the amount of rubber in the blend lies within the range 5 to 35% by weight.

5. A shaped article produced from a composition as claimed in claim 1.

6. A blend comprising a graft copolymer according to claim 1 and a resin which comprises a homogeneous copolymer of acrylonitrile, at least one monovinylidene aromatic compound and a minor amount of at least one copolymerizable ethylenically unsaturated monomer selected from the group consisting of maleimide and its N-substituted derivatives, and norbornene and its derivatives, the molar ratio of acrylonitrile to other monomers in said resin and the superstrate of said graft copolymer being between 2 and 9.

7. A shaped article produced from a composition as claimed in claim 4.

8. A blend comprising (A) a graft copolymer consisting essentially of up to 95% by weight of a substrate of a diene rubber containing from 40% to 100% molar of units from at least one conjugated 1,3-diene monomer and from 0% to 60% molar of units from at least one other ethylenically unsaturated monomer copolymerizable therewith using free radical catalysts, and a homogeneous superstrate consisting of 66.7 to 90% molar of units of acrylonitrile, randomly distributed units of at least one monovinylidene aromatic compound and ethylenically unsaturated monomer copolymerizable with acrylonitrile and said monovinylidene aromatic compound using free radical catalysts, the molar amount of said ethylenically unsaturated monomer being less than the molar amount of said monovinylidene aromatic compound, said graft copolymer being the product obtained by forming a mixture of said rubber, a portion of said monovinylidene aromatic compound and at least a portion of said acrylonitrile and said ethylenically unsaturated monomer, polymerizing said mixture and adding quantities of a monomeric feed selected from the group consisting of said monovinylidene aromatic compound and mixtures of said monovinylidene aromatic compound with any of said acrylonitrile and said ethylenically unsaturated monomer not present in said mixture, said monomeric feed being added to said mixture at a rate determined by the rate of polymer formation and such that the relative concentration of said monovinylidene aromatic compound and acrylonitrile in the reaction mixture remains at about the initial level and (B) a resin which comprises a homogeneous copolymer consisting of 66.7 to 90% molar of units of acrylonitrile, randomly distributed units of at least one monovinylidene aromatic compound and ethylenically unsaturated monomer copolymerizable with acrylonitrile and said monovinylidene aromatic compound using free radical catalysts, the molar amount of said ethylenically unsaturated monomer being less than the molar amount of said monovinylidene aromatic compound, and the amount of rubber in the blend being within the range 1 to 50% by weight.

9. A blend according to claim 8 in which the amount of rubber in the blend lies within the range 5 to 35% by weight.

10. A shaped article produced from a composition as claimed in claim 8.

11. A blend comprising (A) a graft copolymer consisting essentially of up to 95% by weight of a substrate of a diene rubber containing from 40% to 100% molar of units from at least one conjugated 1,3-diene monomer and from 0% to 60% molar of units from at least one other ethylenically unsaturated monomer copolymerizable therewith using free radical catalysts, and a homogeneous superstrate consisting of 66.7 to 90% molar of units of acrylonitrile, randomly distributed units of at least one monovinylidene aromatic compound, and 0 to 5% molar of units of ethylenically unsaturated monomer copolymerizable with acrylonitrile and said monovinylidene aromatic compound using free radical catalysts, said graft copolymer being the product obtained by forming a mixture of said rubber, a portion of said monovinylidene aromatic compound and at least a portion of said acrylonitrile and said ethylenically unsaturated monomer, polymerizing said mixture and adding quantities of a monomeric feed selected from the group consisting of said monovinylidene aromatic compound and mixtures of said monovinylidene aromatic compound and any of said acrylonitrile and said ethylenically unsaturated monomer not present in said mixture, said monomeric feed being added to said mixture at a rate determined by the rate of polymer formation and such that the relative concentration of said monovinylidene aromatic compound and acrylonitrile in the reaction mixture remains at about the initial level and (B) a resin which comprises a homogeneous compolymer consisting of 66.7 to 90% molar of units of acrylonitrile, randomly distributed units of at least one monovinylidene aromatic compound, and 0 to 5% molar units of ethylenically unsaturated monomer copolymerizable with acrylonitrile and said monovinylidene aromatic compound using free radical catalysts, and the amount of rubber in the blend being within the range of 1 to 50% by weight.

12. A blend according to claim 11 in which the amount of rubber in the blend lies within the range 5 to 35% by weight.

13. A shaped article produced from the composition as claimed in claim 11.

14. A blend comprising (A) a graft copolymer consisting essentially of up to 95% by weight of a substrate of a diene rubber containing from 40% to 100% molar of units from at least one conjugated 1,3-diene monomer and from 0% to 60% molar of units from at least one other ethylenically unsaturated monomer copolymerizable therewith using free radical catalysts, and a homogeneous superstrate consisting essentially of units of acrylonitrile and randomly distributed units of at least one monovinylidene aromatic compound, the amount of acrylonitrile being 66.7 to 90% molar, said graft copolymer being the product obtained by forming a mixture of said rubber, a portion of said monovinylidene aromatic compound and at least a portion of said acrylonitrile, polymerizing said mixture and adding quantities of a monomeric feed selected from the group consisting of said monovinylidene aromatic compound and mixtures of said monovinylidene aromatic compound with any of said acrylonitrile not present in said mixture, said monomeric feed being added to said mixture at a rate determined by the rate of polymer formation and such that the relative concentration of said monovinylidene aromatic compound and acrylonitrile in the reaction mixture remains at about the initial level and (B) a resin which comprises a homogeneous compolymer consisting essentially of units of acrylonitrile and randomly distributed units of at least one monovinylidene aromatic compounds, the amount of acrylonitrile being 66.7 to 90% molar, and the amount of rubber in the blend being within the range 1 to 50% by weight. 2 and 9, and the amount of rubber in the blend being within the range 1 to 50% by weight.

15. A blend according to claim 14 which the amount of rubber in the blend lies within the range 5 to 35% by weight.

16. A shaped article produced from a composition as claimed in claim 14.

* * * * *